United States Patent [19]

Pukaite

[11] 4,006,278

[45] Feb. 1, 1977

[54] LOW TEMPERATURE COEFFICIENT OF RESISTIVITY CERMET RESISTORS

[75] Inventor: Clifford Joseph Pukaite, Mequon, Wis.

[73] Assignee: Globe-Union Inc., Milwaukee, Wis.

[22] Filed: Apr. 7, 1975

[21] Appl. No.: 565,870

Related U.S. Application Data

[62] Division of Ser. No. 359,244, May 11, 1973, Pat. No. 3,899,449.

[52] U.S. Cl. ............................... 428/427; 252/518; 338/308; 428/432; 428/472; 428/539

[51] Int. Cl.[2] ................... H01C 17/06; H01B 1/08; B32B 17/00

[58] Field of Search .......... 252/514, 518, 521, 500, 252/518.1, 518.4, 518 R, 521 R, 500, 514; 338/308, 334; 428/432, 434, 469, 472, 539, 427, 446

[56] References Cited

UNITED STATES PATENTS

| | | | |
|---|---|---|---|
| 3,304,199 | 2/1967 | Faber et al. | 252/518 X |
| 3,450,545 | 7/1969 | Ballard et al. | 252/514 X |
| 3,573,229 | 3/1971 | Herbst et al. | 252/514 |
| 3,679,607 | 7/1972 | Angus et al. | 252/518 |
| 3,769,382 | 10/1973 | Kuo et al. | 252/514 X |
| 3,776,772 | 12/1973 | Asada et al. | 252/514 X |
| 3,827,891 | 8/1974 | Larry | 252/514 X |
| 3,916,037 | 10/1975 | Brady et al. | 252/518.1 |

*Primary Examiner*—Harold Ansher
*Attorney, Agent, or Firm*—John Phillip Ryan

[57] ABSTRACT

Cermet resistors based on ruthenium dioxide and in some instances iridium dioxide have been found to have unusually low Temperature Coefficients of Resistivity (TCR) when a particular glass frit and a vanadium oxide additive are utilized. These unique resistors exhibit TCR's of less than ±25 ppm/° C over −55° to ±150° C with the extremes of the TCR varying less than 20 ppm. The vanadium, iridium and ruthenium oxides can be used as such or derived from metal resinates.

3 Claims, 2 Drawing Figures

LOW TEMPERATURE COEFFICIENT OF RESISTIVITY CERMET RESISTORS

CROSS REFERENCE TO RELATED APPLICATIONS

This application is a division of application Ser. No. 359,244, filed May 11, 1973, now U.S. Pat. No. 3,899,449.

BACKGROUND OF THE INVENTION

This invention relates to controlling the temperature coefficient of resistivity (TCR) in resistors. More particularly, it relates to the utilization of vanadium oxide in cermet type resistors to control TCR wherein a distinct advantage is realized in employing a particular glass frit in conjunction with ruthenium and iridium dioxides.

The mechanisms which control or alter the thermostability of cermet resistors is not completely understood. It has been observed that various semiconducting oxides exert an influence on the temperature response of resistivity of cermet resistors so as to make them more thermally stable. Prior to this invention, only resistors described in the electronics industry as thin film resistors have displayed low TCRs. In U.S. Pat. Nos. 2,950,995; 2,950,996 and 3,516,949 vanadium oxide is used in conjunction with noble metal metallizing compositions in relatively small amounts to prevent agglomeration of the metal particles and to improve the solderability, conductivity and/or adhesion properties of the metallizing materials. The same indication of improvement in solderability for these compositions by adding vanadium pentoxide is also indicated in U.S. Pat. No. 3,440,182.

In U.S. Pat. No. 3,553,109 vanadium pentoxide is utilized to control TCR in a resistor composition of the bismuth ruthenate type which utilizes a glass frit binder consisting of 80% lead oxide, 10% silicon oxide and 10% boron oxide. A glass was prepared from the teachings of this particular patent and combined with a conductive phase used to fabricate the resistors of this invention composed of ruthenium dioxide, vanadium pentoxide, and aluminum trioxide as set forth in Example 11. It had a sheet resistivity of 5.49K ohm/sq./mil. and a TCR of +170 ± 10 ppm/° C when measured between +25 and −55° C and a +270 ± 10 ppm/° C when measured between +25 and +150° C. These results clearly indicate that a low TCR cannot be obtained with ruthenium dioxide and vanadium pentoxide which are the preferred materials of this invention when utilized with the glass described in this particular patent. An attempt was also made to prepare a low TCR resistor material utilizing a purchased glass containing 11% calcium oxide, 44.1% lead oxide, 4.0% aluminum trioxide, 5.5% boron trioxide and 35.4% silicon dioxide. This glass material was combined with a conductive material composed of ruthenium dioxide in an amount of 5.34 weight percent prepared from ruthenium resinate containing 5.26 weight percent ruthenium dioxide, iridium dioxide in an amount of 7.2 weight percent prepared from iridium resinate containing 6.99 weight percent iridium dioxide, 2.95 weight percent bismuth trioxide, 4.18 weight percent vanadium pentoxide and the previously described glass in the amount of 80.41 weight percent. The resistive material prepared had a sheet resistivity of 24,000 ohms/sq./mil. and a TCR of −160 ± 10 ppm/° C when measured between +25° C and −55° C and a −50 ± 10 ppm/° C when measured between +25° C and +150° C which is considered poorer than when using the materials of this invention.

It is an object of the present invention to provide a novel resistor composition wherein the temperature coefficient of resistivity is held within a narrow plus and minus range over a broad temperature range. It is another object of this invention to provide a low temperature coefficient of resistivity for a cermet material wherein a vanadium oxide is combined with ruthenium and iridium dioxides in designated quantities. It is still another object of this invention to provide a cermet type resistor with a low TCR which is accomplished by employing vanadium oxides with a particular glass frit. It is yet another object of this invention to provide a low TCR cermet resistor which can be produced by current methods of manufacture and can employ either oxide or metallic resinate precursor materials for both the noble metal oxides and the vanadium oxide.

SUMMARY OF THE INVENTION

The foregoing objects are accomplished and the shortcomings of the prior art are overcome by the present resistor composition wherein a conductive phase composed of ruthenium dioxide and, preferably, in addition iridium dioxide, is combined with a vanadium oxide in designated quantities and with a glass phase composed of a glass frit of a particular composition. These materials are fired together to result in the unique resistor composition having unexpected low TCRs over a broad temperature range. Alternatively, bismuth trioxide can be utilized in the resistive material composition. The ruthenium, iridium and vanadium oxides can be supplied in their oxide form or in the form of resinate precursor materials combined with the particular glass frit.

BRIEF DESCRIPTION OF DRAWING

A better understanding of the advantages of the present resistor material will be afforded by reference to the drawing wherein:

FIG. I is a graph illustrating the low and narrow range of TCR in ppm/° C for the resistor compositions of this invention plotted over a temperature range of −55° C to +150° C wherein the conductive phase is prepared from the resinate of the metals and the data plotted for the material prepared in accordance with Examples 2, 3 and 5.

Figure 1:
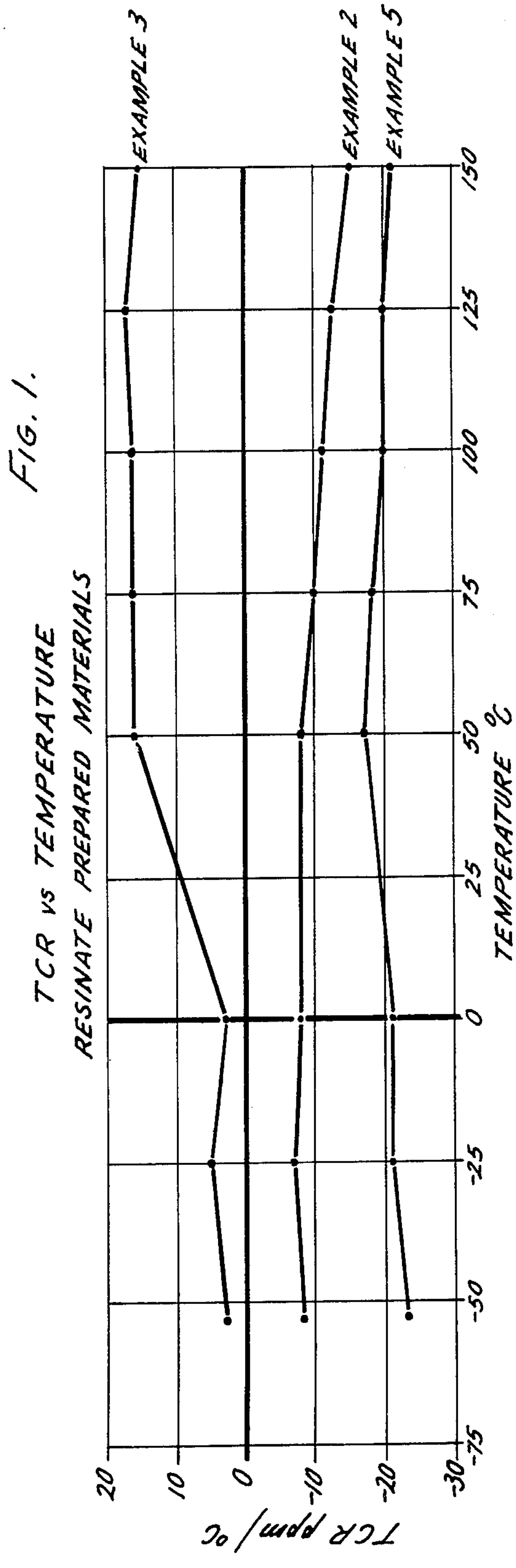
Figure 2:
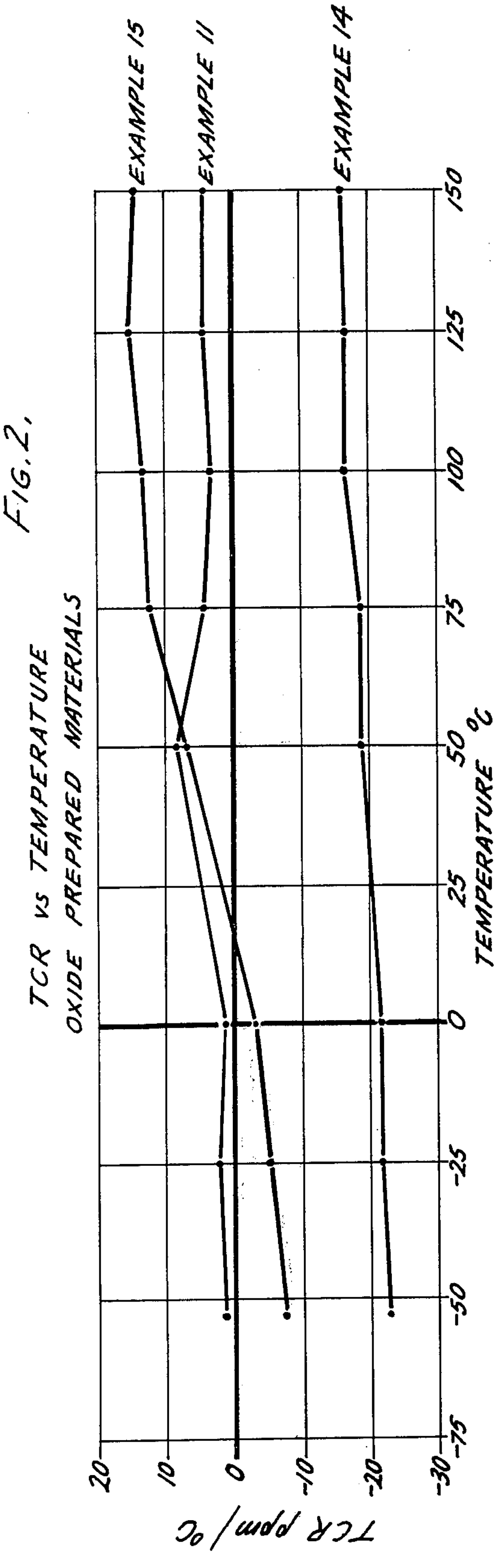

FIG. II is a graph similar to that of FIG. I and illustrating these same critical characteristics but for the resistor material prepared from oxides as described in Examples 11, 14 and 15 with the data plotted for these particular materials.

DESCRIPTION OF THE RESINATE EMBODIMENT

The cermet resistor composition of this invention can be prepared either by utilizing the ruthenium and iridium dioxides in a resinate form for ultimate conversion to the dioxide or can be prepared by utilizing the ruthenium and/or iridium dioxides themselves as starting materials. A description of the cermet resistor composition as prepared from the resinates of ruthenium and iridium will first be given. The particular resinates of ruthenium and iridium employed in the Examples of Table III and in Examples 20, 21 and 22 are designated A-1124 and A-1123, respectively, by the supplier, Engelhard Industries, Inc., Hanovia Liquid Gold Division of East Newark, N.J. They are resinate solutions containing 4.0% ruthenium or 5.26% ruthenium dioxide and 6.0% iridium or 6.99% iridium dioxide, respectively. The range of starting materials for the resinate-prepared compositions and for the glass are described in the following Tables I and II.

TABLE I

Composition Range Of Resistive Material (Conductive Phase)

| Constituents | % By Weight | (Oxide) |
|---|---|---|
| Ruthenium Resinate | 20.00 to 85.00 | 1.00 to 30.00 |
| Iridium Resinate | 5.00 to 45.00 | 1.00 to 15.00 |
| Bismuth Trioxide | 0.00 to 2.25 | 0.00 to 10.00 |
| Vanadium Pentoxide | 0.50 to 2.50 | 1.00 to 10.00 |
| Glass | 5.0 to 40.00 | 50.00 to 98.00 |

TABLE II

Composition Range Of Glass Matrix (Glass Phase)

| Constituent | % By Weight | % By Weight Preferred |
|---|---|---|
| PbO | 35.0 to 45.0 | 38.0 to 45.0 |
| $B_2O_3$ | 15.0 to 25.0 | 17.0 to 21.0 |
| $SiO_2$ | 30.0 to 40.0 | 33.0 to 37.0 |
| CaO | 0 to 2.0 | 1.0 to 2.0 |
| $Al_2O_3$ | 0 to 2.0 | 1.0 to 2.0 |

In the following Examples 1–10, –20, –21 and –22, deriving the oxides from resinate precursors, the following procedures which are standard in this art are employed in all instances:

RESINATE METHOD

1. Weigh constituents in desired proportions.
2. Burn off organic portions of resinate solution at 300° C to 480° C in the presence of the glass frit of median particle size of less than 20 microns.
3. Calcine inorganic residue for 30 to 90 minutes at 400° to 600° C in air.
4. Reduce the particle size of the residue to less than 20 microns, preferably to a median particle size of 5 ± 2 microns by such means as ball milling with alumina grinding media.
5. Mix the resulting powder with a suitable vehicle to a paste of desired consistency. The vehicle may consist of any number of high boiling point organic liquids such as 1-ethyl-2-hexanol which, in combination with the resistive powder, have a viscosity suitable for screen printing, dipping, or painting onto a substrate.
6. Screen print onto a ceramic insulating substrate by methods common to the thick film electronic art. An example of applicable substrate material is CRL 95 alumina. (Centralab Division of Globe-Union Inc.)
7. Fire at 850° C to 950° C in belt kiln using a 0.5 to 3 hour firing cycle.

Table III illustrates the compositions and test results for the novel resistor material prepared in accordance with this invention and employing ruthenium and iridium resinates as starting materials.

TABLE III

| Raw Material | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Ru Resinate wt. %* (5.26% $RuO_2$) | 22.16 | 9.30 | 4.76 | 3.55 | 3.52 | 24.32 | 10.38 | 5.36 | 2.12 | 1.79 |
| Ir Resinate wt. %* (6.99% $IrO_2$) | 3.32 | 13.04 | 6.69 | 4.97 | 4.93 | 3.46 | 13.81 | 7.12 | 6.23 | 2.36 |
| $Bi_2O_3$ wt. % | 3.30 | 3.04 | 2.98 | 4.58 | 4.55 | 2.93 | 2.99 | 2.95 | 1.89 | 0.14 |
| $V_2O_5$ wt. % | 5.75 | 6.48 | 4.23 | 5.00 | 5.57 | 5.82 | 5.81 | 4.17 | 1.34 | 0.46 |
| Glass FB-199N** wt.% | 65.72 | 68.14 | 81.33 | 81.89 | 81.41 | 63.46 | 67.01 | 80.39 | 88.41 | 95.25 |
| Average Sheet*** Resistivity ohm/sq./mil. | 200 | 310 | 1,300 | 2,600 | 3,070 | 100 | 300 | 1,500 | 3,000 | 10,000 |
| Average TCR ppm/° C**** | | | | | | | | | | |
| −55° C to 25° C | −28 | −8 | +3 | −2 | −23 | −15 | −13 | −5 | +1 | −14 |
| 25° C to 150° C | +4 | −15 | +15 | −6 | −21 | +16 | +5 | +10 | +14 | +56 |

*Based on oxide composition
** Ferro Corporation: 44.9% wt. PbO; 20.1% wt. $B_2O_3$; 35.0% wt. $SiO_2$
***All figures for Average Sheet Resistivity are in round numbers
****TCR measured to ± 3 ppm/° C As is seen in Table III, and particularly Example 10, the best results are obtained utilizing the resinate starting materials at lower resistive values.

DESCRIPTION OF THE OXIDE EMBODIMENT

Examples 11–18 in Table V illustrate the utilization of ruthenium oxide as the starting material combined with a glass frit generally described in Table II. For a series of resistive materials, using oxides as starting materials, the compositions described in the following Table IV are suitable:

TABLE IV

Composition Range Of Resistive Material (Conductive Phase)

| Constituent | % By Weight | % By Weight Preferred |
|---|---|---|
| $RuO_2$ | 1.00 to 30.00 | 2.00 to 25.00 |
| $IrO_2$ | 1.00 to 15.00 | 3.00 to 14.00 |
| $Bi_2O_3$ | 0.00 to 10.00 | 0.00 to 5.00 |
| $V_2O_5$ | 1.00 to 10.00 | 1.00 to 8.00 |
| $Al_2O_3$ | 0.00 to 10.00 | 0.00 to 7.00 |
| Glass* | 50.00 to 98.00 | 63.00 to 95.00 |

*Same composition as in Table II

It should be recognized that the amounts of the designated compositions after they are fired onto the substrate will be as indicated in this Table and in the column entitled "% by Weight (Oxide)" in Table I. Consequently, the preferred amounts of the materials indicated in Tables I and IV are the same.

The method for preparing each of the cermet resistor compositions of Examples 11–18 is standard in the art and is as follows:

OXIDE METHOD

1. Weigh constituents in desired proportions.
2. Mix constituents together in a ball mill with acetone to form a slurry and ball mill with a grinding median alumina for 0.1 to 8.0 hours.
3. Dry mixture at 70° C.
4. Mix with a vehicle such as 1-ethyl-2-hexanol to form a paint.

5. Mill the resulting paint in a three roll mill for 0.1 to 2 hours to assure dispersion and adjust consistency for screen printing by adding solvent.

6. Screen onto a ceramic insulating substrate.

7. Fire at 850° C to 950° C in a belt type kiln in a 0.5 to 3 hour firing cycle.

TABLE V

| Raw Material | Ex. 11 | Ex. 12 | Ex. 13 | Ex. 14 | Ex. 15 | Ex. 16 | Ex. 17 | Ex. 18 |
|---|---|---|---|---|---|---|---|---|
| $RuO_2$wt. % | 5.67 | 5.95 | 4.73 | 3.90 | 4.60 | 3.75 | 5.78 M.B. Type A* | 5.78 M.B. Type P** |
| $IrO_2$wt. % | — | — | — | — | — | — | — | — |
| $V_2O_5$ wt. % | 2.83 | 2.77 | 3.15 | 1.90 | 1.90 | 1.50 | 1.73 | 1.73 |
| $Al_2O_3$ wt. % | 0.75 | 1.41 | 6.90 | — | 7.00 | — | — | — |
| Glass FB-199N*** wt.% | 90.73 | 90.26 | 85.22 | 94.1 | 86.50 | 94.75 | 92.49 | 92.49 |
| Average Sheet Resistivity**** ohm/sq./mil. | 6.80 | 8600 | 27,900 | 53,200 | 112,900 | 449,100 | 400,000 | 30,000 |
| Average TCR ppm/° C***** | | | | | | | | |
| −55° C to 25° C | 0 | +10 | +16 | −23 | −8 | −14 | −6 | −20 |
| 25° C to 150° C | +4 | +10 | +13 | −18 | +14 | +24 | +12 | +2339 |

*M.B. = Matthey Bishop Type A
** = Matthey Bishop Type P
***Same as Table II
****Note: All figures for Average Sheet Resistivity are in round numbers
*****TCR's measured to ± 3 ppm/° C Table V illustrates that low TCRs over the entire temperature range are obtained with the oxide of ruthenium in conjunction with vanadium pentoxide.

As indicated in Examples 1–18 in Tables III and V, the TCRs of the designated novel compositions have very low values over a broad temperature range. The low temperature coefficient of resistivity, thick film resistor materials of this invention may also be prepared from precursors of the conductive phase other than resinates. For example, ruthenium hydrate may be utilized as a starting material. This is illustrated in the following example:

Example 19

| Ingredients | % By Weight |
|---|---|
| Ruthenium Hydrate ($55\%$ $RuO_2$) | 5.78 |
| $V_2O_5$ | 1.73 |
| Glass FB-199N (As indicated in Tables III and V) | 92.49 |

This material is processed in the same method as indicated for the oxide starting materials under the heading "Oxide Method."

Results:
Sheet Resistivity: 20,000 ohms/sq./mil.
TCR ppm/° C:

| | |
|---|---|
| −55° C to 25° C | −12 |
| 25° C to 150° C | +47 |

As indicated in this Example 19, when the ruthenium oxide is added in the form of the hydrate the TCR is not as low as when the starting material is the oxide or the resinate.

The following Example 20 illustrates the utilization of vanadium pentoxide predissolved in the glass designated FB-199N to the extent of 6.48% by weight.

Example 20

Example 20-continued

| Ingredients | % by Weight Oxide |
|---|---|
| Ruthenium Resinate ($5.26\%$ $RuO_2$) | 10.37 |
| Iridium Resinate ($6.99\%$ $IrO_2$) | 13.78 |
| $Bi_2O_3$ | 2.99 |
| Glass FB-199N/$V_2O_5$ (FB-199N: as indicated in Tables III and V) | 72.85 |

These materials are processed by the method indicated above under the heading "Resinate Method."

Results:
Sheet Resistivity: approximately 500 ohms/sq./mil.
TCR ppm/° C:

| | |
|---|---|
| −55° C to 25° C | −29 ± 3 |
| 25° C to 150° C | −27 ± 3 |

In all of the previous Examples, the vanadium oxide has been introduced preferably as vanadium pentoxide. It should be understood that other oxides of vanadium such as vanadium trioxide can likewise be employed. Additionally, the vanadium oxide can be introduced through a vanadium resinate precursor material. Examples 21 and 22 following illustrate these.

Example 21

| Ingredients | % By Weight Oxide |
|---|---|
| Ruthenium Resinate ($5.26\%$ $RuO_2$) | 10.48 |
| Iridium Resinate ($6.99\%$ $IrO_2$) | 13.93 |
| $V_2O_3$ | 4.84 |
| $Bi_2O_3$ | 3.02 |
| Glass FB-199N (As indicated in Tables III and V) | 67.72 |

These materials are processed by the method indicated above under the heading "Resinate Method."

Results:
Sheet Resistivity: approximately 330 ohms/sq./mil.
TCR ppm/° C:

| | |
|---|---|
| −55° C to 25° C | +13 ± 3 |

-continued

| Results: | |
|---|---|
| Sheet Resistivity: approximately 330 ohms/sq./mil. | |
| TCR ppm/° C: | |
| 25° C to 150° C | +19 ± 3 |

The following Example 22 indicates utilization of vanadium oxide introduced as vanadium resinate.

Example 22

| Ingredients | % By Weight Oxide |
|---|---|
| Ruthenium Resinate ($5.26\%\ RuO_2$) | 9.98 |
| Iridium Resinate ($6.99\%\ IrO_2$) | 13.27 |
| Vanadium Resinate ($13.92\%\ V_2O_5$) | 9.48 |
| $Bi_2O_3$ | 2.88 |
| Glass FB-199N (As indicated in Tables III and V) | 64.39 |
| Results: | |
| Sheet Resistivity: | 280 ohms/sq./mil. |
| TCR ppm/° C: | |
| −55° C to 25° C | +26 ± 3 |
| 25° C to 150° C | +21 ± 3 |

The above materials are processed by the method indicated above under the heading "Resinate Method."

The above materials are processed by the method indicated above under the heading "Resinate Method."

As indicated above, the important conditions for achieving the low temperature coefficient of resistivity are the utilization of vanadium oxide with ruthenium dioxide, which preferably can also include iridium dioxide, in the designated amount with a particular glass composition. The vanadium oxide as well as the ruthenium and iridium dioxides can be utilized as oxides or derived from resinate precursors. While vanadium pentoxide is the preferred oxide of vanadium, other oxides such as vanadium trioxide or those oxides resulting from the pyrolysis of vanadium resinate can likewise be employed to advantage.

It will thus be seen that through the present invention, there is now provided a cermet resistor composition having a low temperature coefficient of resistivity which can be effected at the extremes and generally less than 20 ppm/° C, maintained over a broad temperature range. The vanadium oxide can be utilized in various stages of oxidation and in the form of the resinate as can the ruthenium and the iridium dioxides. The materials are easily processed into resistive paints. No additional capital investment need be incurred to substitute the cermet resistor compositions of this invention for more conventional compositions, and they can be easily fabricated into thick film resistors without additional skills being required by the fabricator.

The foregoing invention can now be practiced by those skilled in the art. Such skilled persons will know that the invention is not necessarily restricted to the particular embodiments herein. The scope of the invention is to be defined by the terms of the following claims as given meaning by the preceding description.

I claim:

1. A cermet resistor comprising: a substrate composed of a ceramic insulating material, a conductive phase and a glass phase interdispersed and fused to said substrate, said conductive phase composed of vanadium oxide in the range from about 1.00 to about 10.00 weight percent and ruthenium dioxide in the range of from about 1.00 to about 30.00 weight percent, and said interdispersed glass phase present in the range of about 50.00 to about 98.00 weight percent, said glass phase composed of lead oxide in the range of about 35.00 to about 45.00 weight percent, boron trioxide in the range of about 15.00 to about 25.00 weight percent and silicon dioxide present in the range of about 30.00 to about 40.00 weight percent.

2. The cermet resistor as defined in claim 1 further including iridium dioxide present in the range of about 1.00 to about 15.00 weight percent.

3. The cermet resistor as defined in claim 2 wherein said vanadium oxide is vanadium pentoxide.

* * * * *